J. W. CARVER.
Combined Cutter, Wheel and Paneling Device for Shoemakers.

No. 167,430.  
Patented Sept. 7, 1875.

Witnesses:  
F. H. Adams  
E. A. Stock

Inventor:  
Jas. W. Carver  
by J. H. Adams  
Atty.

UNITED STATES PATENT OFFICE.

JAMES W. CARVER, OF LYNN, ASSIGNOR TO HIMSELF AND GEORGE H. MORRISON, OF EAST BOSTON, MASSACHUSETTS.

IMPROVEMENT IN COMBINED CUTTER-WHEELS AND PANELING DEVICES FOR SHOEMAKERS.

Specification forming part of Letters Patent No. 167,430, dated September 7, 1875; application filed June 29, 1875.

*To all whom it may concern:*

Be it known that I, JAMES W. CARVER, of Lynn, in the county of Essex and State of Massachusetts, have invented a Combined Cutter-Wheel and Paneling Device, of which the following is a specification:

The object of my invention is to combine in one instrument three several devices used in finishing the soles and shanks of boots and shoes, by means of which the labor of handling three distinct tools is obviated and much time is saved, the three tools being such as are generally used one after the other in finishing more particularly the shanks of fancy shoe-soles.

Figure 1:
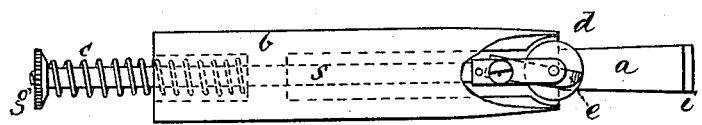
Figure 2:
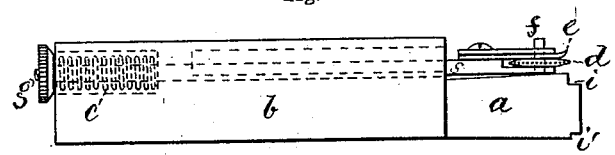
Figure 3:
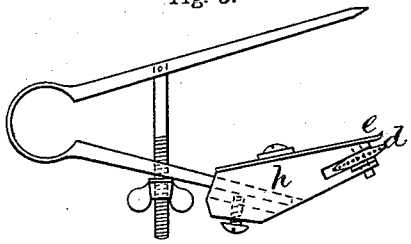
Figure 4:
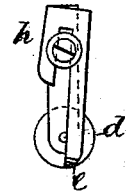

In the drawings, Figure 1 represents my invention with a portion of the handle-casing broken away. Fig. 2 represents the wheel and cutter projected from the handle for use. Fig. 3 represents the wheel and cutter attached to one leg of a pair of dividers; and Fig. 4 is a view, showing the method of attaching the cutter and adjusting the same.

*b* represents the handle. The portion of which that holds the paneling-tool is made of wood as a non-conductor of heat from the said tool, which is usually heated when required for use. Over one side of the handle, and extending the whole length of the same, is a thin sheet of metal, forming a covering for a wheel and a cuttter and the shank to which they are attached. On the end of the shank *s* is a thumb-nut, *g*, and surrounding the rear portion of the shank is a coiled spring, *c*, which serves to retract the shank and retain the wheel and cutter within the handle when the same are not in use, as shown in Fig. 1. On the front end of the shank *s* is arranged a wheel, *d*, having teeth or projections on its perimeter for marking dotted lines on the shoe sole and shank. Outside the wheel *d* is arranged an adjustable cutter, *e*, for marking the line between the colored or blackened portion of the shank or sole and the uncolored or plain portion of the same. The cutter *e* is secured to the shank *s* by a set-screw in a slot in the cutter, so as to adjust it to project more or less, as required, in making a cut or mark in the sole and shank.

The operation is as follows: The instrument being grasped by the hand, the edges of the sole and shank are polished in the usual way by the paneling-tool *a*. When this is completed the operator simply presses his thumb on the thumb-nut *g* and forces out the shank *s*, carrying the cutter *c* and dotter-wheel *d*, each making the necessary mark on the sole and shank. The shoulder *i* on the paneling-tool *a* serves also as a guide for the knife and wheel, thus insuring a regular mark of the same. The cutter and wheel may be arranged for adjustment to a greater or less distance from the guide *i*, as required.

Fig. 3 shows the attachment of the cutter and wheel to one leg of a pair of dividers for the purpose of more accurately marking the curved lines on the shank of the shoe-sole.

It will thus be seen that the combined tool above described is not only a labor-saving device, but serves to finish the sole and shank more accurately and rapidly than can be done by the separate tools in common use for performing the required style of work.

What I claim as my invention, and desire to secure by Letters Patent, is—

1. A shoemaker's tool composed of the paneling-tool *a*, handle *b*, sliding shank *s*, marking-wheel *d*, and cutter *e*, the said parts being constructed and arranged substantially as shown and described.

2. The combination of the marking-wheel *d* and cutter *e*, attached to the sliding shank *s*, substantially as and for the purpose described.

3. The combination of the marking-wheel *d* and cutter *e*, adjustably connected with each other, and arranged for joint and simultaneous operation, as set forth.

4. The combination of the shoulder *i* of the paneling-tool *a*, acting as a guide, with the marking-wheel *d* and cutter *e*, one or both, as shown and described.

In testimony whereof I have signed my name to this specification in the presence of two subscribing witnesses.

JAS. W. CARVER.

Witnesses:
J. H. ADAMS,
E. A. STOCK.